United States Patent

[11] 3,633,754

| [72] | Inventor | David C. Marsh |
| | | Chagrin Falls, Ohio |
| [21] | Appl. No. | 887,856 |
| [22] | Filed | Dec. 24, 1969 |
| [45] | Patented | Jan. 11, 1972 |
| [73] | Assignee | Borg-Warner Corporation |
| | | Chicago, Ill. |

[54] SELF-CLEANING ROTARY FLUID FILTRATION SYSTEM
1 Claim, 3 Drawing Figs.

[52] U.S. Cl.................................................... 210/360,
210/391, 210/416
[51] Int. Cl..................................................... B01d 33/06
[50] Field of Search........................................... 210/82,
391, 393, 360, 360 A, 416; 209/270

[56] References Cited
UNITED STATES PATENTS

| 3,241,675 | 3/1966 | Pashaian et al. | 210/360 |
| 3,363,771 | 1/1968 | Walters | 210/360 |
| 3,452,875 | 7/1969 | Rich et al. | 209/270 X |

*Primary Examiner*—J. L. De Cesare
*Attorneys*—Donald W. Banner, William S. McCyrry and John W. Butcher

ABSTRACT: Fluid from a contaminated source passes through a filter screen; the pressure drop causes contaminants to adhere to the screen. Backflow of fluid through the screen caused by a hydrodynamic or aerodynamic skid removes any contaminants from the screen.

SELF-CLEANING ROTARY FLUID FILTRATION SYSTEM

BACKGROUND OF THE INVENTION

Modern fuel systems require fuel free or substantially free of contaminants yet the fuel supplied to the system contains various contaminants in particle form which can seriously affect the operation of the system.

THE INVENTION

According to the invention herein described, fuel enters an inlet of a separator-pump and the reaction of the fuel and the separator-pump blades imparts rotational motion to the fuel. Part of the fuel (i.e., approximately 5 to 10 percent) and most of the particulate contaminants (i.e., approximately 90 to 95 percent) returns to the source or sump through a first discharge port. The remainder and bulk of the fuel and the remainder of the contaminants are discharged through a rotating screen upon which is collected to contaminants. The cleaned fuel flows to a location of use, such as an aircraft engine, or the like.

In order to remove contaminants from the screen which would otherwise eventually block the flow of fuel therethrough, a small percentage of the cleaned fuel, as on the order of 1 percent or less, is caused to reverse its flow, flow back through screen, remove contaminants therefrom which flow to the sump. The reverse flow is caused by a stationary hydrodynamic skid cooperating with the rotating screen, such that intermittent flow reversal is provided about the entire peripheral extent of the filter screen.

THE DRAWINGS

THE PREFERRED EMBODIMENT

Figure 1:
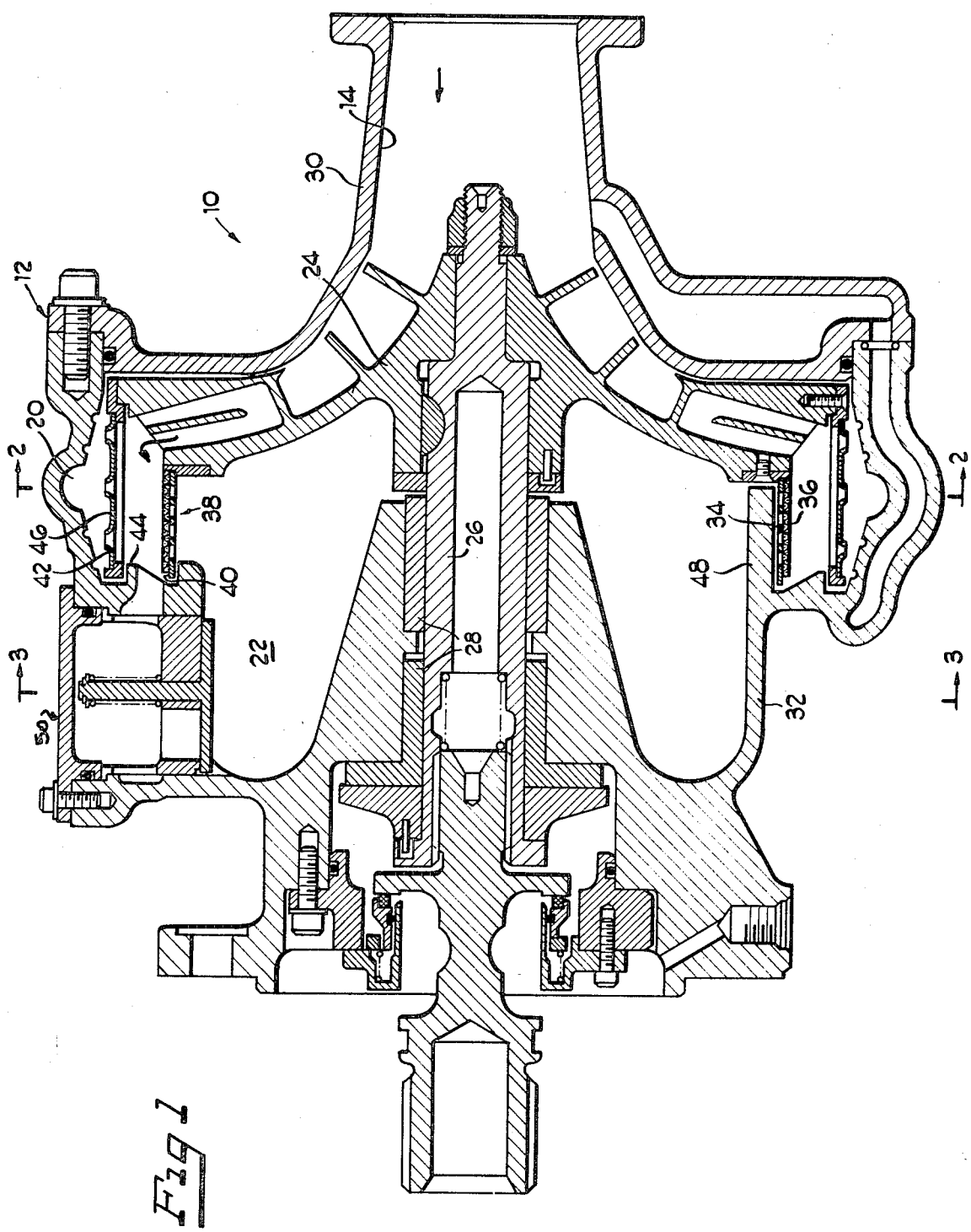
FIG. 1 is a longitudinal section through a fluid fuel device constructed in accordance with this invention.

In the drawings, there is illustrated a mechanically driven separator-pump 10 having a housing 12 with a fluid inlet 14 and fluid outlets 16 and 18 connected, respectively, with outlet cavities 20 and 22. The direction of fluid flow in all figures is indicated by appropriate arrows. Included in the separator-pump is a bladed impeller 24 connected to a shaft 26 journaled for rotation in sleeve bearings 28 retained in the housing 12. The impeller 24 imparts rotational movement to the fluid in its travel through the turbine. The housing 12 is constructed of multiple parts bolted together, i.e., a cover member 30 and a body member 32. The outlets 16 and 18 and the outlet cavities 20 and 22 are formed in the member 32. The outlets 16 and 18 are tangential to the cavities 20 and 22 respectively.

A perforated cylindrical member 34 with an overlying filter screen 36 is attached to a flange of the impeller 24 for rotation therewith and the member 34 and the screen 36 project rearwardly of the impeller 24 across a space 38 through which fluid flows into the outlet cavity 22 to the outlet 18. To insure that all fluid passing to the outlet 18 goes through the screen 36, the screen and its supporting member overlie a notch 40 in the body member 32.

A perforated cylindrical member 42 is attached to the impeller 24 concentrically with the member 34 and partially overlies a notch 44 in the body member 32. The member 42 projects across an opening 46 leading to the outlet cavity 20, such that fluid flowing to the outlet cavity 20 and the outlet 16 flows therethrough.

Figure 2:
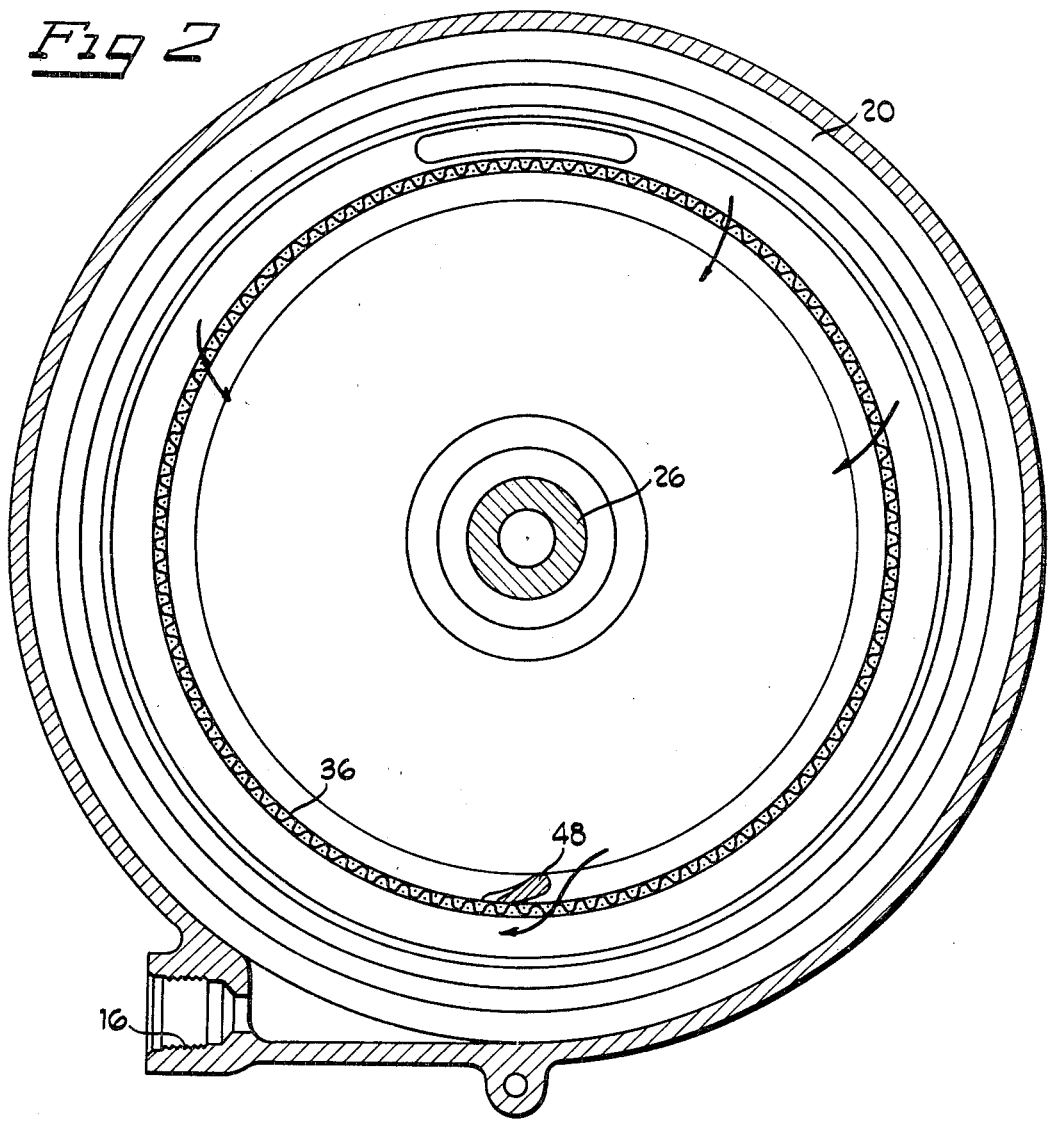
FIG. 2 is a cross section taken along the line 2—2 of FIG. 1.
Figure 3:
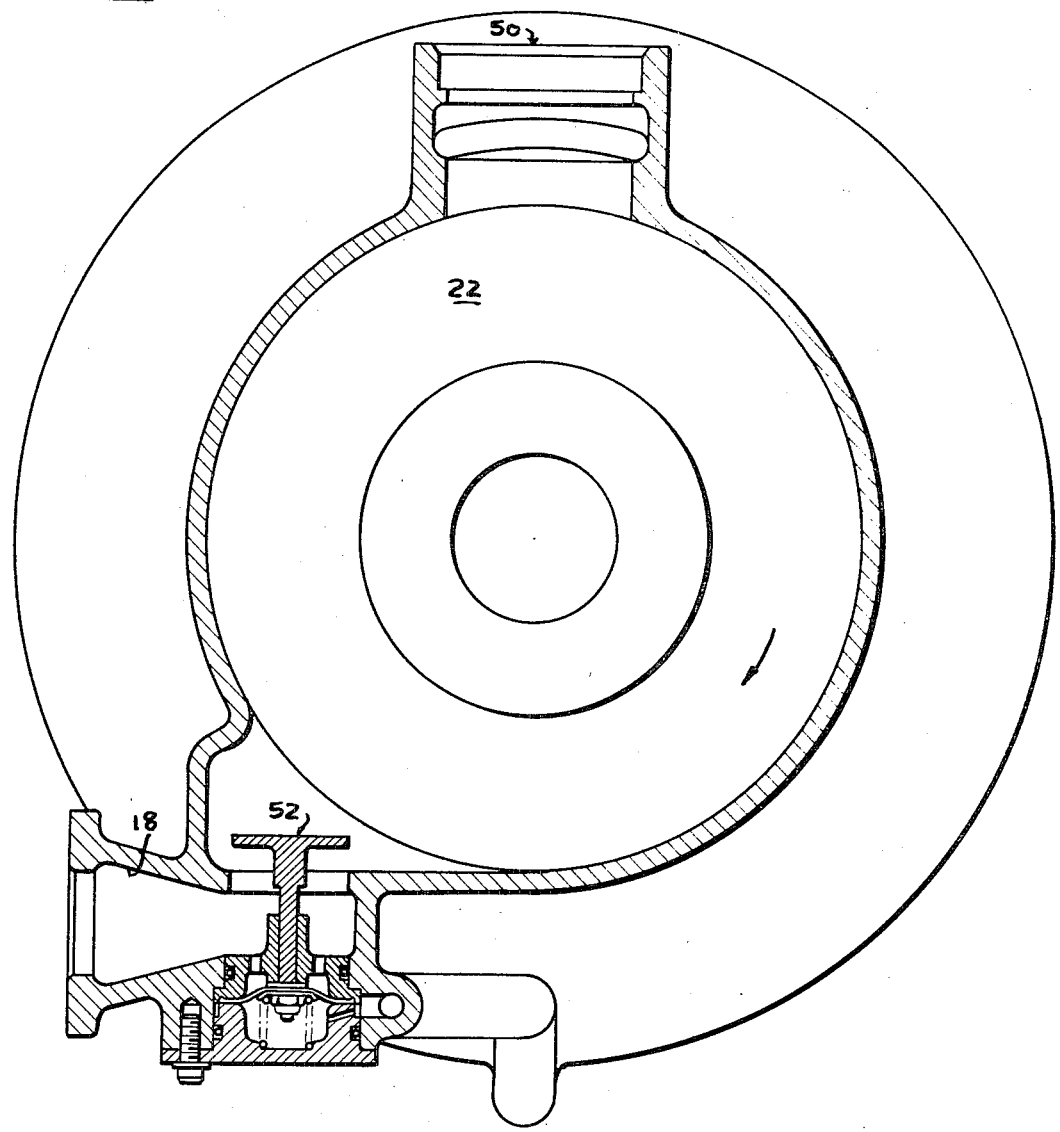
FIG. 3 is a cross section taken along the line 3—3 of FIG. 1.

A projection or hydrodynamic skid 48 (see especially FIG. 2) is formed with or attached to the body member 32, so as to be in close proximity to the screen 36. The skid 48 is essentially of tear drop cross section and extends substantially the width of the screen. It is positioned relative to the screen 36, so that a small portion of the fluid which has passed through the screen 36 is diverted and flows back through the screen.

Appropriate conventional valves 50 and 52 are included in the system. In that these valves do not affect the invention being described, no explanation is deemed necessary.

In operation, contaminated fluid, generally fuel from a source such as a sump and tank, flows into the inlet 14 and contacts the impeller 24. The impeller is such that the fluid is caused to rotate and flow to the outlet cavities 20 and 22. A small portion of the fluid flows into the cavity 20 and to the outlet 16 which is connected to the sump (not shown). Most of the solid particulate contamination in the fluid flows into the cavity 20. The remainder of the solid particulate contaminates and bulk of the fluid flows into the cavity 22 to the outlet 18 and thence to its location of use. In flowing into the outlet cavity, the fluid flows through the screen 36. The mesh of the screen 36 is chosen to remove the particulate contaminants from the fluid so that the fluid at the outlet 18 is free or substantially free of such contaminants. In the absence of cleaning, and after a period of use, the screen 36 becomes clogged and eventually flow therethrough is seriously impeded.

Cleaning of the screen 36 is accomplished by the skid 48 which diverts a small portion of the fluid flowing in the outlet cavity 22 and causes it to flow in a reverse direction (from the normal flow through the screen 36 to the outlet 18) through the screen 36. The reverse flow removes collected particles from the screen which fail to be carried out of the turbine in the fluid flow through the outlet 16. In that the screen 36 rotates, every increment thereof is subjected to the cleaning action of the reverse flow of fluid caused by the skid 48 during each revolution of the impeller 24.

This invention has been described with reference to a separator-pump; it is to be understood that it can be adapted to other fluid handling structures in which there is provided relative rotation between a skid or the like or its functional equivalent and a screen for filtering a fluid and collecting the contaminants therefrom.

What is claimed is:

1. A combined pump and self-cleaning centrifugal contamination separator comprising:

a housing having a longitudinal axis;

an inlet in said housing, and extending along said axis, for receiving fluid subject to contamination by the presence therein of undesirable suspended solid particles;

means, including a cylindrical filter screen having radially inner and outer surfaces, for providing within said housing an inner chamber radially inward of said filter screen and an outer generally annual chamber radially outward of and encircling said cylindrical screen;

a first discharge outlet in said housing communicating with said inner chamber;

a second discharge outlet in said housing communicating with said outer chamber;

means, including a centrifugal impeller, for rotating said cylindrical filter screen and for spinning the contaminated fluid around said outer annular chamber at a relatively high velocity while at the same time pumping that contaminated fluid radially inward toward said inner chamber, the solid contaminants centrifuging radially outward to facilitate their separation and removal through said second discharge outlet while the remaining clean fluid passes radially inward through said cylindrical filter screen to said inner chamber from which it may be exhausted through said first discharge outlet, some of the separated contaminants tending to adhere to and collect on said radially outer surface of said screen;

and filter cleaning means for back-flushing said filter screen to remove from said outer surface those contaminants tending to collect thereon and including a stationary hydrodynamic skid positioned radially inward of said filter screen adjacent to a very small section of tee rotating inner surface and tear drop shaped to cause a small portion of the clean fluid to be diverted and driven back out through an incremental area of said screen, in the direction from said radially inner to said radially outer surface, thereby subjecting the entirety of the rotating filter screen to the cleaning action of the reverse fluid flow during each revolution.

* * * * *